(12) United States Patent
Cheng et al.

(10) Patent No.: US 12,671,351 B2
(45) Date of Patent: Jun. 30, 2026

(54) FULL-BRIDGE INVERTER DEVICE

(71) Applicant: Wei-Kuan Cheng, Taoyuan City (TW)

(72) Inventors: Wei-Hao Cheng, Taoyuan City (TW);
Laskar Pamungkas, Taoyuan City
(TW); Irawan Yusa Harjanto, Taoyuan
City (TW)

(73) Assignee: Wei-Kuan Cheng, Taoyuan City (TW)

( * ) Notice: Subject to any disclaimer, the term of this
patent is extended or adjusted under 35
U.S.C. 154(b) by 0 days.

(21) Appl. No.: 18/915,742

(22) Filed: Oct. 15, 2024

(65) Prior Publication Data

US 2026/0106556 A1 Apr. 16, 2026

(51) Int. Cl.
H02M 7/5387 (2007.01)
H02J 3/38 (2006.01)
H02M 1/08 (2006.01)
H02J 101/24 (2026.01)

(52) U.S. Cl.
CPC ........... H02M 7/53871 (2013.01); H02J 3/38
(2013.01); H02M 1/08 (2013.01); *H02J*
*2101/24* (2026.01)

(58) Field of Classification Search
CPC ............................................... H02M 7/53871
See application file for complete search history.

(56) References Cited

U.S. PATENT DOCUMENTS

2004/0174720 A1* 9/2004 Kurokami ......... H02M 7/53871
363/16

* cited by examiner

*Primary Examiner* — Daniel Kessie
(74) *Attorney, Agent, or Firm* — MUNCY, GEISSLER,
OLDS & LOWE, P.C.

(57) ABSTRACT

A full-bridge inverter device includes channel-1 including
first inverter formed of first DC link capacitor, first full
bridge circuit and first output filter, second voltage and
current probes and first AC load, first full bridge circuit
being coupled with first gate driver circuit and first sin pulse
width modulation that provides first positive half cycle
output signal and first negative half cycle output signal; and
channel-2 including second inverter formed of second DC
link capacitor, second full bridge circuit and second output
filter, third voltage and current probes and second AC load,
second full bridge circuit being coupled with second gate
driving circuit and second sin pulse width modulation that
provides second positive half cycle output signal and second
negative half cycle output signal. The phase difference
between first positive (negative) half cycle output signal and
second positive (negative) half cycle output signal is 90
degrees.

5 Claims, 5 Drawing Sheets

FULL-BRIDGE INVERTER DEVICE

BACKGROUND OF THE INVENTION

1. Field of the Invention

The invention relates to a full-bridge inverter device provided in a solar power generation system, comprising a DC source provided by a solar battery, first voltage and current probes for detecting said DC source, a channel-1 coupled to the first voltage and current probes, and a channel-2 connected in parallel to the channel-1. The full-bridge inverter device composed of the channel-1 and the channel-2 has the effect of reducing input peak current and dual output power.

2. Description of the Related Art

Most of the world's electricity comes from nuclear and thermal power generation systems. However, the pollution of air and environment caused by the above two power generation systems and the subsequent waste disposal must be properly handled, otherwise it may cause more harm to animals and plants. The green energy power generation industry, including solar, wind, hydro, steam or geothermal, has become the antidote to environmental sustainability. Solar power generation is an early developed and mature technology. The output of the solar battery, which converts light energy into electrical energy for storage, is single-phase direct current. It must be converted from direct current (DC) to alternating current (AC) through an inverter before it can be provided to the AC load or on-grid system. According to the grid regulations, the AC power connected to the grid must be a sine (cosine) waveform and must meet the peak voltage and frequency requirements of the grid regulations.

As we know, a solar power generation system provides AC power to the grid through a pair of power lines and consists of an inverter that transmits the RMS power of AC power to the corresponding power lines. However, it is known that the peak current of the inverter input is higher, so the solar battery must also provide a large current to meet the needs when supplying power. However, providing a large current for a long time will shorten the life of the solar battery. Furthermore, traditional solar power generation systems only use a single channel to supply AC load or on-grid system, and their application scenarios are relatively limited. Therefore, it is necessary for those engaged in this industry to improve the aforementioned problems.

SUMMARY OF THE INVENTION

Therefore, in view of the above-mentioned problems and deficiencies, the inventor collected relevant information and, after multiple evaluations and considerations, designed the invention of this full-bridge inverter device.

It is the main object of the present invention to provide a full-bridge inverter device comprising a channel-1 and a channel-2. The channel-1 comprises a first DC link capacitor, a first full bridge circuit, a first output filter, second voltage and current probes and a first AC load coupled to the first voltage and current probes. The first DC link capacitor, the first full bridge circuit and the first output filter constitute a first inverter. The first full bridge circuit is further coupled with a first gate driver circuit and a first sin pulse width modulation that provides a first positive half cycle output signal and a first negative half cycle output signal. The channel-2 comprises a second DC link capacitor, a second full bridge circuit, a second output filter, third voltage and current probes and a second AC load coupled to the first voltage and current probes. The second DC link capacitor, the second full bridge circuit and the second output filter constitute a second inverter. The second full bridge circuit is further coupled with a second gate driving circuit and a second sin pulse width modulation that provides a second positive half cycle output signal and a second negative half cycle output signal. The first positive half cycle output signal and the second positive half cycle output signal have a 90 degrees phase difference therebetween. The first negative half cycle output signal and the second negative half cycle output signal have a 90 degrees phase difference therebetween. The full-bridge inverter device is provided in a solar power generation system that includes a DC source provided by a solar battery and a first voltage and current probes for detecting the DC source. The first voltage and current probes are coupled with the channel-1 and the channel-2 which is parallel to the channel-1. The full-bridge inverter device composed of the channel-1 and the channel-2 has the effect of reducing input peak current and dual output power.

Another object of the present invention is that the first sin pulse width modulation further includes a first comparator. The positive input terminal of the first comparator is connected to a first mod index and a first sinusoidal reference and the end forms a ground. The negative input terminal of the first comparator is connected to a triangular carrier and the end forms a ground. The positive power supply terminal of the first comparator is connected to Vcc. The negative power supply terminal of the first comparator forms a ground. The output terminal of the first comparator forms the first positive half cycle output signal and the first negative half cycle output signal connected to the first inverter.

Still another object of the present invention is that the second sin pulse width modulation further includes a second comparator. The positive input terminal of the second comparator is connected to a second mod index and a second sinusoidal reference and the end forms a ground. The negative input terminal of the second comparator is connected to a triangular carrier and the end forms a ground. The positive power supply terminal of the second comparator is connected to Vcc. The negative power supply terminal of the second comparator forms a ground. The output terminal of the second comparator is formed with the second positive half cycle output signal and the second negative half cycle output signal connected to the second inverter.

DETAILED DESCRIPTION OF THE PREFERRED EMBODIMENT

Figure 1:
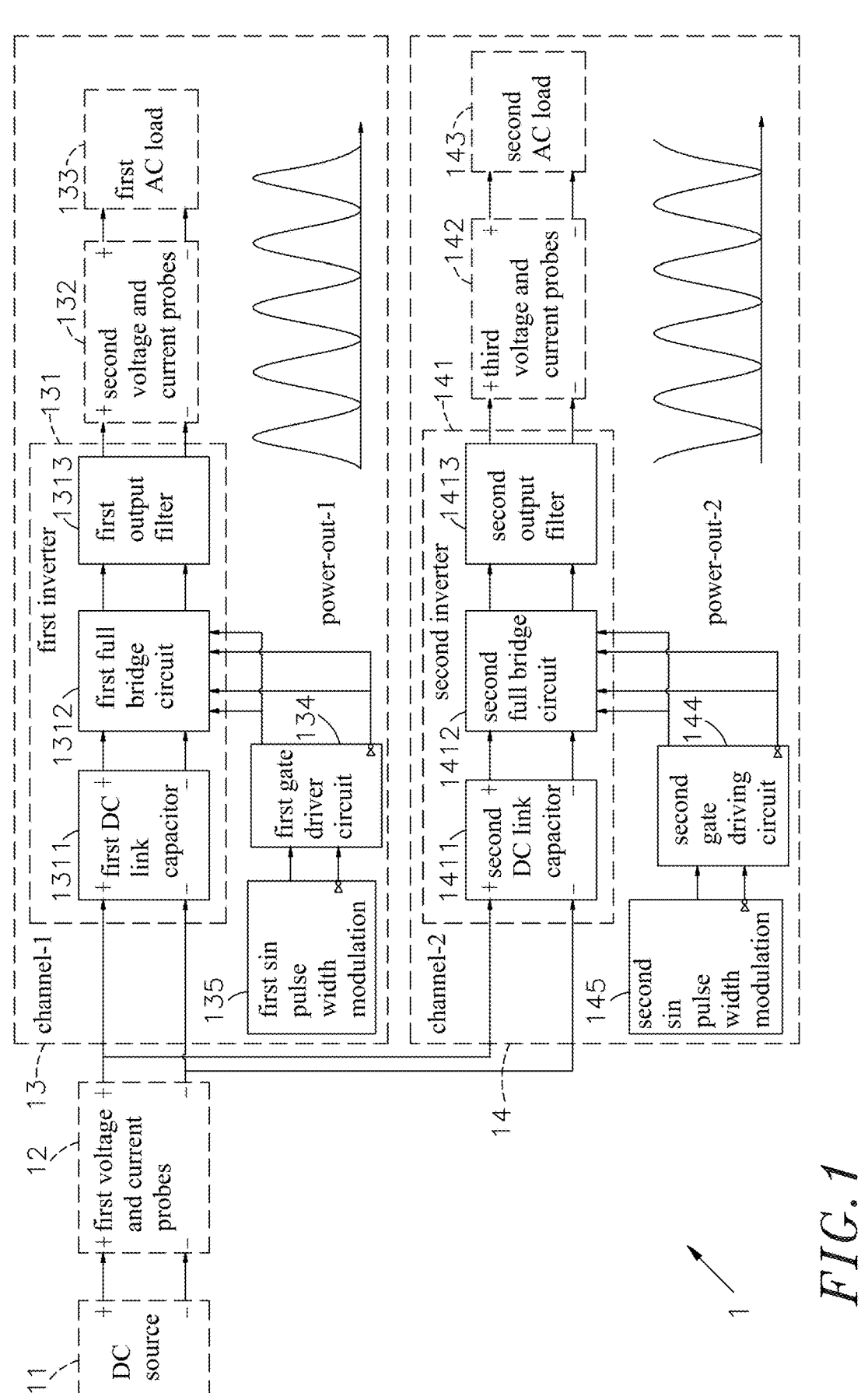
FIG. 1 is a functional block diagram of the full-bridge inverter device of the present invention.

In order to achieve the above objects and effects, the technical means and structures adopted by the present invention are described in detail below with respect to the preferred embodiment of the present invention in companying with the drawings, so as to facilitate a complete understanding.

Please refer to FIGS. 1-5, which are functional block diagram of the full-bridge inverter device of the present invention, the detailed circuit diagram of the channel-1 and channel-2 of the present invention, the circuit diagram of the first inverter of the present invention, the circuit diagram of the second inverter of the present invention, and a graph showing the output voltage, input power and output power of the dual-channel device of the present invention. As can be clearly seen from the figures, the full-bridge inverter device 1 of the present invention mainly comprises: a DC Source 11, first voltage and current probes 12, a channel-1 13 and a channel-2 14, all components and features of which are described in detail as follows:

A full-bridge inverter device 1 is provided in a solar power generation system, and comprises a DC Source 11 provided by a solar battery and first voltage and current probes 12 for detecting the DC Source 11, wherein the first voltage and current probes 12 are coupled to a channel-1 13 and a channel-2 14 connected in parallel to the channel-1 13. The channel-1 13 comprises a first DC link capacitor 1311, a first full bridge circuit 1312, a first output filter 1313, second voltage and current probes 132 and a first AC load 133 coupled to the first voltage and current probes 12. The first DC link capacitor 1311, the first full bridge circuit 1312 and the first output filter 1313 constitute the first inverter 131. The first full bridge circuit 1312 is further coupled to a first gate driver circuit 134 and a first sin pulse width modulation 135 that provides a first positive half cycle output signal 1356 and a first negative half cycle output signal 1357. The aforementioned first full bridge circuit 1312 is composed of four active switches (Q1-Q4), and the four active switches are all composed of Enhancement MOSFETs.

The channel-2 14 comprises a second DC link capacitor 1411, a second full bridge circuit 1412, a second output filter 1413, third voltage and current probes 142 and a second AC load 143 coupled to the first voltage and current probes 12. The second DC link capacitor 1411, the second full bridge circuit 1412 and the second output filter 1413 constitute a second inverter 141. The second full bridge circuit 1412 is further coupled to a second gate driving circuit 144 and a second sin pulse width modulation 145 that provides a second positive half cycle output signal 1456 and a second negative half cycle output signal 1457. The phase difference between the first positive half cycle output signal 1356 and the second positive half cycle output signal 1456 is 90 degrees. The phase difference between the first negative half cycle output signal 1357 and the second negative half cycle output signal 1457 is 90 degrees. The full-bridge inverter device 1 formed by the aforementioned channel-1 13 and the channel-2 14 has the effect of reducing the input peak current and the dual output power. The aforementioned second full bridge circuit 1412 is composed of four active switches (Q5~Q8), and the four active switches are all composed of Enhancement MOSFETs.

The first sin pulse width modulation 135 further comprises a first comparator 1351. The positive input terminal of the first comparator 1351 is connected to a first mod index 1352 and a first sinusoidal reference 1353 and the ends form a ground. The negative input terminal of the first comparator 1351 is connected to a triangular carrier 1354 and the end forms a ground. The positive power supply terminal of the first comparator 1351 is connected to Vcc. The negative power supply terminal of the first comparator 1351 forms a ground. The output terminal of the first comparator 1351 forms the first positive half cycle output signal 1356 and the first negative half cycle output signal 1357 connected to a first inverter 1355.

The aforementioned second sin pulse width modulation 145 further comprises a second comparator 1451. The positive input terminal of the second comparator 1451 is connected to a second mod index 1452 and a second sinusoidal reference 1453 and the ends form a ground. The negative input terminal of the second comparator 1451 is connected to a triangular carrier 1454 and the end forms a ground. The positive power supply terminal of the second comparator 1451 is connected to Vcc. The negative power supply terminal of the second comparator 1451 forms a ground. The output terminal of the second comparator 1451 forms the second positive half cycle output signal 1456 and the second negative half cycle output signal 1457 connected to a second inverter 1455. The first AC load 133 mentioned above refers to the on-grid system or off-grid load. The second AC load 143 refers to the on-grid system or off-grid load.

Figure 2:
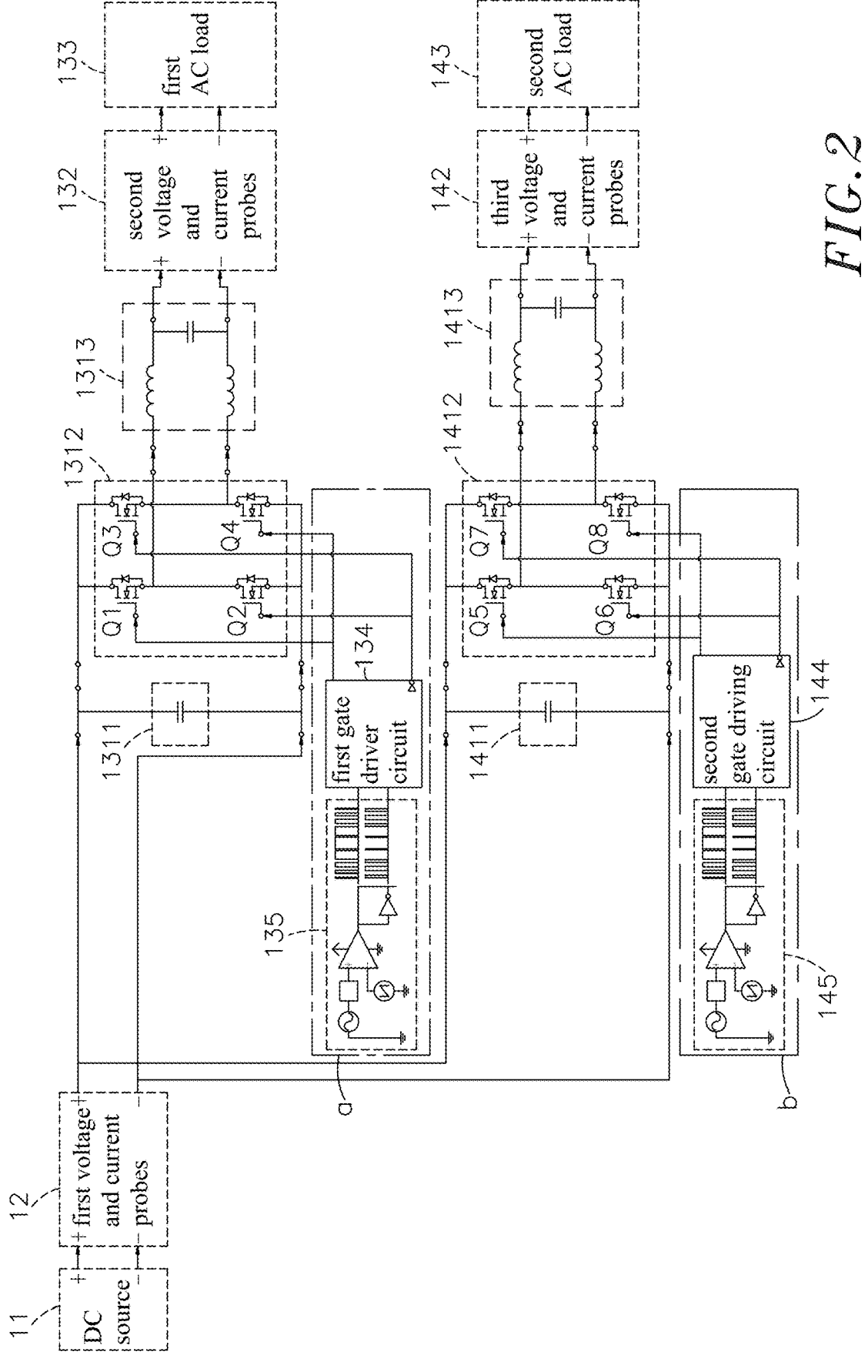
FIG. 2 is a detailed circuit diagram of the channel-1 and channel-2 of the present invention.
Figure 3:
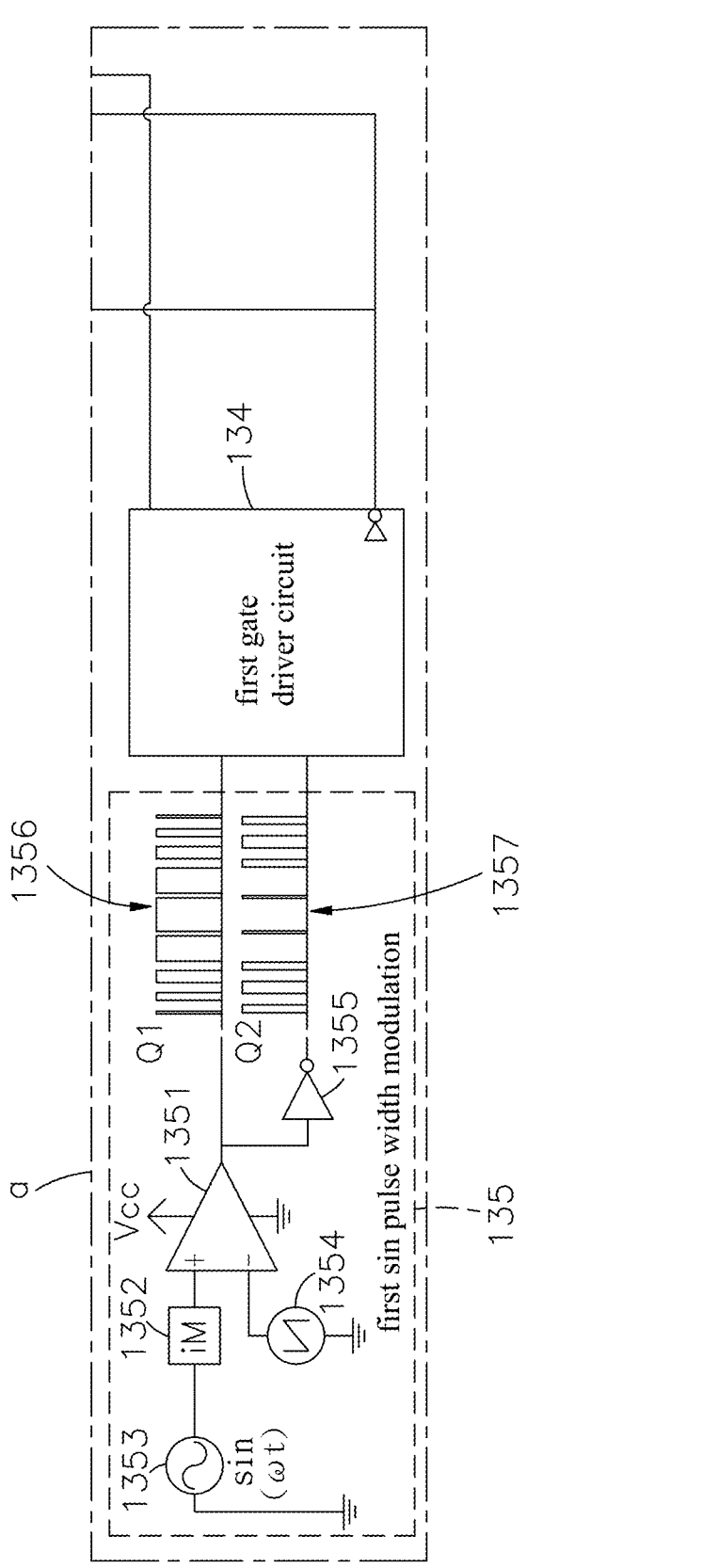
FIG. 3 is the circuit diagram of the first inverter of the present invention.
Figure 4:
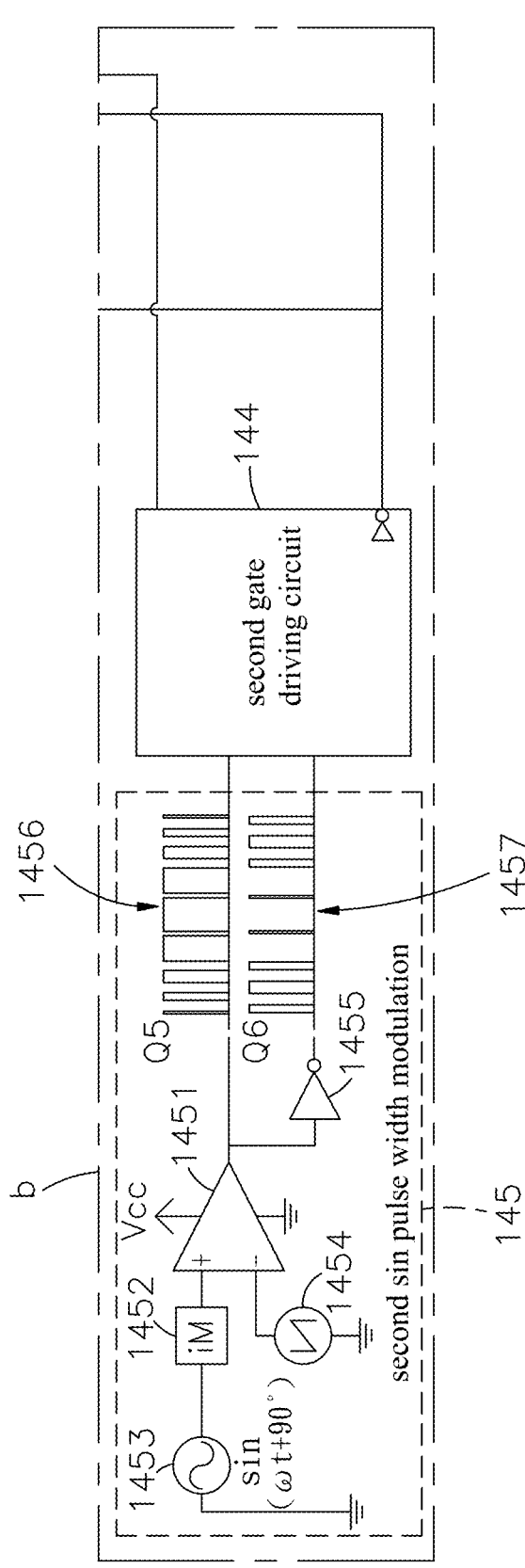
FIG. 4 is the circuit diagram of the second inverter of the present invention.

Please refer to FIG. 2, the first output filter 1313 is provided with an inductor at each of the two wires on the output side of the first full bridge circuit 1312, and a capacitor is connected across the two inductors. The second output filter 1413 is provided with an inductor at each of the two wires on the output side of the second full bridge circuit 1412, and a capacitor is connected across the two inductors.

Figure 5:
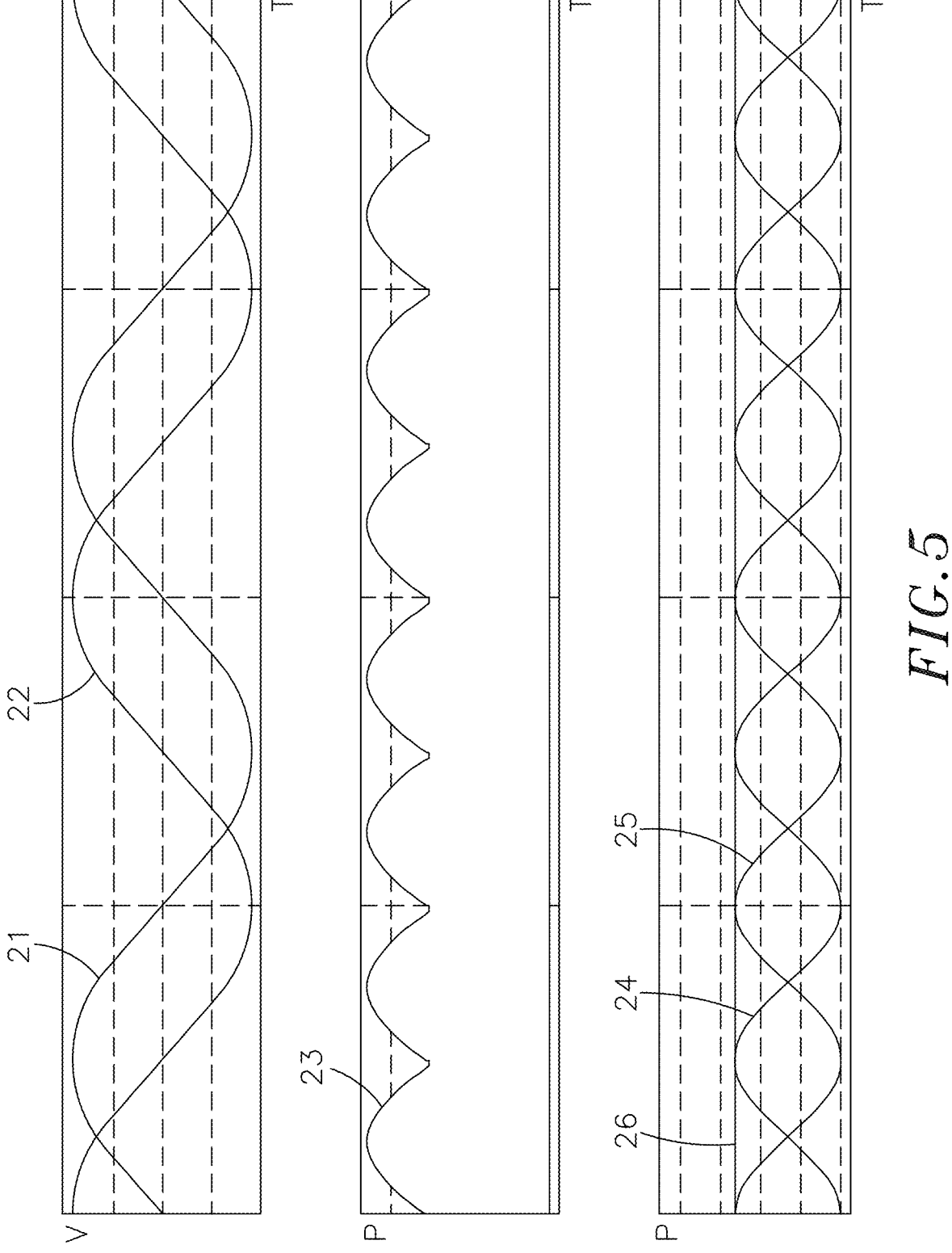
FIG. 5 is a graph showing the output voltage, input power and output power of the dual-channel device of the present invention.

As shown in FIG. 5, it includes three curves, namely, upper, middle and lower. The upper curve shows that the phase difference between the vout-1 21 of the channel-1 13 and the vout-2 22 of the channel-2 14 is 90 degrees. The optimal phase difference between the first positive half cycle output signal 1356 and the second positive half cycle output signal 1456 is: the phase of the first positive half cycle output signal 1356 leads the second positive half cycle output signal 1456 by 90 degrees. The optimal phase difference between the first negative half cycle output signal 1357 and the second negative half cycle output signal 1457 is: the phase of the first negative half cycle output signal 1357 leads the second negative half cycle output signal 1457 by 90 degrees. The middle curve shows that by setting the phase difference between the vout-1 21 and the vout-2 22 to 90 degrees, a continuous power-in 23 can be obtained. The lower shows that the phase difference between the power-out-1 24 of the channel-1 13 and the power-out-2 25 of the channel-2 14 is 180 degrees, so the power sum 26 of the two (power-out-1)+(power-out-2) is approximately equal to direct current (DC).

The full-bridge inverter device of the present invention has the following advantages:

1. The DC source 11 provided by the solar battery and the first voltage and current probes 12 for detecting the DC source 11, wherein the first voltage and current probes 12 are coupled to the channel-1 13 and the channel-2 14 connected in parallel to the channel-1 13, and the full-bridge inverter device 1 constituted by the channel-1 13 and the channel-2 14 has the effect of dual output power.

2. By simultaneously capturing the DC source 11 through the first inverter 131 and the second inverter 141, the input peak current can be reduced. The lower input peak current can extend the service life of the DC source 11 composed of the solar battery.

The above is only a preferred embodiment of the present invention, and does not limit the patent scope of the present invention. Therefore, all simple modifications and equivalent structural changes made by using the contents of the description and drawings of the present invention should be included in the patent scope of the present invention and should be declared.

In summary, the full-bridge inverter device of the present invention can achieve its efficacy and purpose when used. Therefore, this invention is truly an invention with excellent practicality. In order to meet the application requirements for invention patents, an application is filed in accordance with the law. We hope that the review committee will approve this case as soon as possible to protect the inventor's hard work. If the review committee has any questions, please feel free to write to us for instructions. The inventor will do his best to cooperate and we will be very grateful.

What the invention claimed is:

1. A full-bridge inverter device provided in a solar power generation system, comprising a DC source provided by a solar battery, third voltage and current probes for detecting said DC source, a channel-1 coupled to said third voltage and current probes and a channel-2 connected in parallel to said channel-1, wherein:

said channel-1 comprises a first DC link capacitor, a first full bridge circuit, a first output filter, first voltage and current probes and a first AC load coupled to said third voltage and current probes, said first DC link capacitor, said first full bridge circuit and said first output filter constituting a first inverter, said first full bridge circuit being further coupled with a first gate driver circuit and a first sine pulse width modulation that provides a first positive half cycle output signal and a first negative half cycle output signal;

said channel-2 comprises a second DC link capacitor, a second full bridge circuit, a second output filter, second voltage and current probes and a second AC load coupled to said third voltage and current probes, said second DC link capacitor, said second full bridge circuit and said second output filter constituting a second inverter, said second full bridge circuit being further coupled with a second gate driver circuit and a second sine pulse width modulation that provides a second positive half cycle output signal and a second negative half cycle output signal, said first positive half cycle output signal and said second positive half cycle output signal having a 90 degrees phase difference therebetween, said first negative half cycle output signal and said second negative half cycle output signal having a 90 degrees phase difference therebetween, said full-bridge inverter device composed of said channel-1 and said channel-2 reducing input peak current and combined output power, wherein said first sine pulse width modulation comprises a first comparator, said first comparator comprising a positive input terminal connected to a first modulation index, which is connected to a first sinusoidal reference having an end connected to a ground, a negative input terminal connected to a triangular carrier having an end connected to a ground, a positive power supply terminal connected to Vcc, a negative power supply terminal connected to a ground, and an output terminal forming said first positive half cycle output signal and connected to a first inverter that forms said first negative half cycle output signal, and wherein said second sine pulse width modulation comprises a second comparator, said second comparator comprising a positive input terminal connected to a second modulation index, which is connected to a second sinusoidal reference having an connected to a ground, a negative input terminal connected to a triangular carrier having an end connected to a ground, a positive power supply terminal connected to Vcc, a negative power supply terminal connected to a ground, and an output terminal forming said second positive half cycle output signal and connected to a second inverter that forms said second negative half cycle output signal.

2. The full-bridge inverter device as claimed in claim 1, wherein said first AC load receives a signal from on-grid system or off-grid load.

3. The full-bridge inverter device as claimed in claim 1, wherein said second AC load receives a signal from on-grid system or off-grid load.

4. The full-bridge inverter device as claimed in claim 1, wherein said first output filter includes two inductors respectively connected to one of two wires on an output side of said first full bridge circuit, and a capacitor is connected across said two inductors.

5. The full-bridge inverter device as claimed in claim 1, wherein said second output filter includes two inductors respectively connected to one of two wires on an output side of said second full bridge circuit, and a capacitor is connected across said two inductors.

* * * * *